March 14, 1967 A. E. POPODI 3,309,560

LINEARITY CORRECTION APPARATUS

Filed Oct. 10, 1963 2 Sheets-Sheet 1

WITNESSES

Theodore F. Wrobel

James F. Young

INVENTOR

Alfred E. Popodi

BY Ernest P. Klipfel

ATTORNEY

March 14, 1967 A. E. POPODI 3,309,560

LINEARITY CORRECTION APPARATUS

Filed Oct. 10, 1963 2 Sheets-Sheet 2

United States Patent Office 3,309,560

Patented Mar. 14, 1967

3,309,560

LINEARITY CORRECTION APPARATUS

Alfred E. Popodi, Glen Burnie, Md., assignor to Westinghouse Electric Corporation, Pittsburgh, Pa., a corporation of Pennsylvania Filed Oct. 10, 1963, Ser. No. 315,303
11 Claims. (Cl. 315—24)

This invention relates generally to apparatus for correcting distortion appearing in displays produced by the electromagnetic deflection of an electron beam in a cathode ray tube and more particularly to apparatus for eliminating pincushion distortion.

In different types of cathode ray tube apparatus, it is usually desired to deflect a beam of electrons or other electrical particles back and forth over a target area in a series of parallel lines so that the beam may be said to scan a portion of the target area. The scanning pattern thus formed is generally termed a raster. If the cathode ray beam is magnetically deflected and the center of curvature of the screen or target area coincides with the center of deflection of the beam, the various dimensions of the raster are directly proportional to the sine of the deflection angles through which the beam is deflected. However, if these centers do not coincide, the raster is distorted as the dimensions of the raster are not proportional to the sine of the angles through which the beam is deflected. When the center of the beam deflection lies between the screen or target and the center of curvature of the target area, nonlinearity is produced which is termed pincushion distortion.

Several methods are known in the art for correcting pincushion distortion. One method of correcting for pincushion distortion is to provide optical correction by using special lens type face plates. This solution is expensive and has little flexibility. Another method is by waveshaping each deflection signal by predistorting the deflection current for each axis of deflection. This method gives only first order approximation because the horizontal correction is not a function of the vertical deflection and vice versa. This approach while acceptable for constant frequency systems such as television is not satisfactory for variable deflection rates or random access systems. Deflection yoke correction utilizing a non-uniform field deflection yoke is another common method of offsetting pincushion distortion. This technique can eliminate the pincushion effect from an esthetic point of view; however, the relationship between coil current and spot deflection is still nonlinear which is intolerable for a high quality display. Furthermore, exact correction cannot be obtained by this method because the correction is a function of only one deflection component.

It is an object of the present invention therefore to provide means for establishing linearity and connecting pincushion distortion of a cathode ray tube display.

It is another object of the present invention to provide a means to establish linearity and to correct for pincushion distortion taking into account that correction in one deflection axis also depends upon the deflection in the other deflection axis.

It is still a further object to provide a means for establishing a linear relationship between deflection input signals an dspot deflection thereby obviating the necessity for special deflection yoke apparatus.

It is still another object of the present invention to correct for pincushion distortion without bandwidth degradation in order to provide a relatively high speed deflection system including a random access capability.

Briefly, the subject invention comprises a voltage controlled nonlinear voltage divider in both the horizontal and vertical deflection circuit providing a corrected output deflection signal which is a function of both the horizontal and vertical deflection signals. Each voltage divider comprises a network which includes a plurality of resistors, a plurality of diodes and one transistor which are operably connected together such that deflection signal inputs from both deflection circuits vary the divider ratio of the respective voltage divider according to a predetermined correction curve which is a function of the tube geometry of the cathode ray tube employed.

Other objects and advantages will become more clearly understood after a detailed description of the subject invention considered with the following drawings, in which.

Figure 1:
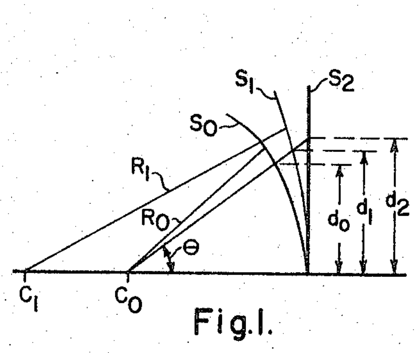
FIGURE 1 is a diagram illustrating deflection nonlinearity of a cathode ray tube display as a function of screen curvature.

Attention is now directed to FIGURE 1. In a magnetic deflection system for cathode ray tubes, a linear relationship between coil current and spot deflection must be maintained. This linearity, however, exists only for a target or screen $S_0$ whose radius of curvature $R_0$ is equal to the distance between the target and center of deflection $C_0$. Since the sine of the deflection angle $\theta$ is proportional to the current in the deflection coil I and since the deflection $d_0=R_0\times\sin\theta$, the desired proportionality exists. For a larger screen radius $R_1$ with a center of curvature $C_1$ but maintaining the original center of deflection $C_0$ the apparent deflection on the target $S_1$ will be larger than $d_0$ as indicated by the distance $d_1$.

Figure 2:
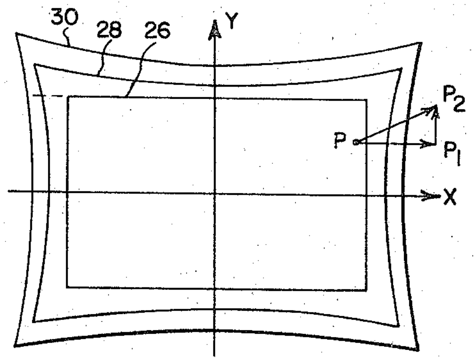
FIG. 2 is an illustration of the effect of pincushion distortion upon the raster shape and the effective correction which is possible by the use of the subject invention.

In the case of a relatively flat screen or target $S_2$, the deflection $d_2$ for an angle $\theta$ where the deflection center is $C_0$ is $d_2=R_0/\cos\theta$. It can be stated that whenever the center of deflection $C_4$ lies between the center of curvature $C_1$ of the cathode ray tube and the target a nonlinearity or nonlinear relationship occurs. FIGURE 2 is illustrative of the shape of a raster traced on the targets $S_0$, $S_1$ and $S_2$ of FIGURE 1 where the center of deflection is $C_0$. Trace 26 is a substantially rectilinear raster indicative of a linear relationship between deflection current and deflection distance as would be provided by the target $S_0$ in FIGURE 2. With a relatively larger radius of curvature such as target $S_1$, a trace 28 would be described extending the outer extremities providing a raster which exhibits the pincushion effect. With the relatively flat target or screen $S_2$ a raster 30 would be described indicating that the pincushion effect progressively worsens as the radius of curvature increases towards infinity.

In order to correct the pincushion distortion it is important to note that the correction in one axis, for example the horizontal axis, also depends on the deflection in the other or vertical axis. If in FIGURE 2 the spot produced by the electron beam being deflected to point P has the horizontal deflection increased only while maintaining the vertical deflection constant, the spot would move along a curved path towards point $P_2$ and not to $P_1$ due to the pincushion effect. Since the non-linearity produces a larger deflection than is supposed to occur for larger magnitudes of deflection current, a correction decreasing the deflection signal for relatively larger deflection currents must be provided if linearity is to be maintained. However, due to the fact that point P of FIG. 2 which is located at a predetermined point away from either axis varies in both directions for a command in only one direction and therefore the vertical deflection must also decrease when the horizontal deflection increases and vice versa.

Figure 3:
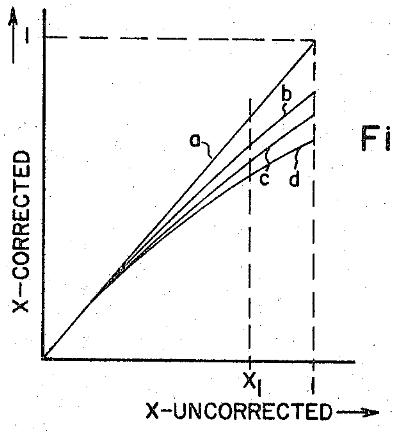
FIG. 3 is an illustration of a family of normalized correction curves for a cathode ray tube of a given type as a function of the horizontal and vertical deflection inputs.

FIGURE 3 shows a family of normalized correction curves for a selected cathdoe ray tube type as a function of horizontal and vertical inputs. More particularly FIGURE 3 indicates that for any horizontal deflection signal a corrected horizontal deflection signal should be provided which is less than the input and one which varies nonlinearly with respect to the input. Thus, for any given horizontal deflection signal $X_1$ an uncorrected deflection signal would be found along curve *a*. Curve *b* denotes the necessary correction for the horizontal axis alone where a horizontal deflection without any correction to the vertical axis is $(Y=0)$. Curve *d* shows the necessary correction for a horizontal deflection input signal $X_1$ where the input to the vertical axis is maximum, or in other words it describes the horizontal axis connection at the upper and lower raster boundaries $(Y=\pm 1)$. The most accurate method of overcoming pincushion distortion is to control the deflection amplifier input in such a manner that a linear relationship between the deflection system input and the spot deflection is obtained. For practical purposes, this control can be achieved by properly attenuating the input signal as a function of both the horizontal and vertical deflection signals.

Figure 4:
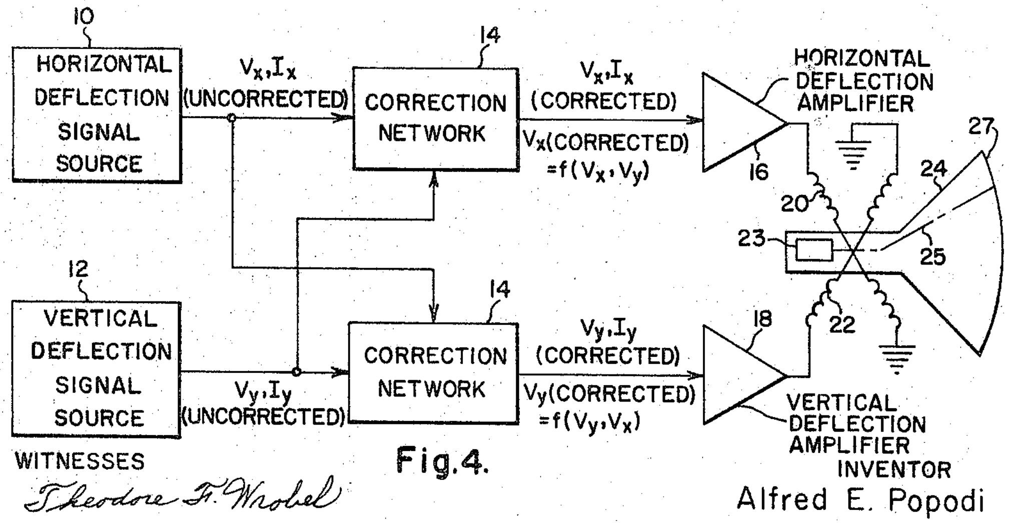
FIG. 4 is a block diagram illustrative of a preferred embodiment of the present invention.

The present invention provides such a correcting device. It comprises two substantially identical correction units one in each deflection circuit. Each unit has inputs of deflection signals from both the horizontal and the vertical coordinates. FIGURE 4 illustrates in block diagrammatic form a deflection system embodying the subject invention for both the horizontal (X) and the vertical (Y) axes. Shown therein is a source of horizontal deflection signals 10 and a source of vertical deflection signals 12 providing output voltage and current signals of $V_x$ and $I_x$, and $V_y$ and $I_y$, respectively. A horizontal deflection amplifier 16 and a vertical deflection amplifier 18 are coupled to magnetic horizontal and vertical deflection coils 20 and 22, respectively, which deflect an electron beam 25 from a beam source 23 to a screen or target means 27 of cathode ray tube device 24. The two deflection amplifiers 16 and 18 including the deflection coils 20 and 22 are assumed to be substantially identical and linear devices. Preceding deflection amplifiers 16 and 18 is a correction network 14 which has a nonlinear output characteristic. The correction network 14 represents essentially a nonlinear voltage divider with its attenuation dependent on the amplitude of its input signals. The correction network 14 for both the horizontal deflection amplifier 16 and for the vertical deflection 18 have two input signals directed thereto representative of deflection signals from both the horizontal deflection signal source 10 and the vertical deflection signal source 12 in a manner which will be hereinafter described in greater detail. The correction network 14 directs a corrected deflection signal to its respective deflection amplifier such that the corrected signal is equal to a function of both the X and the Y deflection signals.

Figure 5:
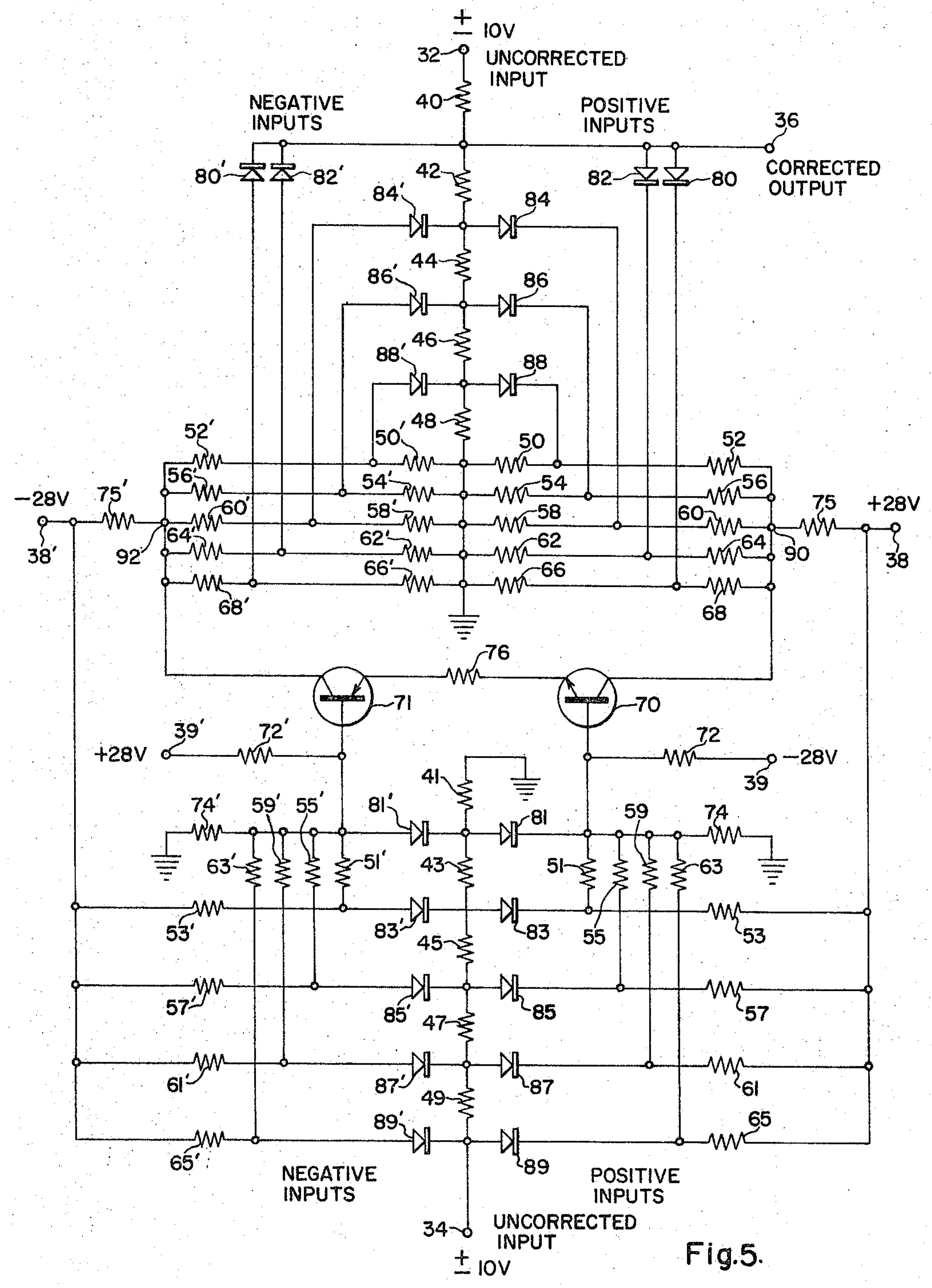
FIG. 5 is a schematic diagram of an embodiment implementing the relationship of the correction desired according to FIG. 3.

FIGURE 5 is a schematic circuit diagram of a preferred embodiment of the correction network 14. For purposes of explanation only the correction network 14 coupled between the source of horizontal deflection signals 10 and the horizontal deflection amplifier 16 will be described. It should be understood that the correction network 14 for the vertical deflection circuit is substantially identical to that connected in the horizontal deflection circuit the only difference being that the inputs are reversed.

Shown in FIGURE 5 is a first input terminal 32 to which is applied the deflection input signal from a source of horizontal deflection signals 10, not shown. A first resistance voltage divider comprising the resistors 40, 42, 44, 46 and 48 are connected in series between input terminal 32 and a point of reference potential illustrated as ground. The first voltage divider is designated the "On axis" voltage divider. An output terminal 36 is connected to the common connection of resistors 40 and 42. A plurality of diodes 80, 82, 84, 86 and 88, and their symmetrical complement diodes 80', 82', 84', 86' and 88' are coupled to the "On axis" voltage divider such that the anode electrode of diodes 80, 82 and the cathode electrodes of diodes 80' and 82' are connected to the common connection between resistors 40 and 42. The anode electrode of diode 84 and the cathode electrode of diode 84' are connected to the common connection between resistors 42 and 44. Likewise the anode electrode of diode 86 and the cathode electrode of diode 86' are connected to the common junction between resistors 44 and 46 and finally the anode electrode of diode 88 and the cathode electrode of diode 88' are connected to the common connection between resistors 46 and 48. The diodes 80 to 88 are connected to the "On axis" voltage divider for purposes of controlling the voltage divider ratio thereof for positive input deflection signals in a manner which will be subsequently explained, while the diodes 80' through 88' are symmetrically arranged with respect to diodes 80 through 88 for the purposes of affecting the voltage divider ratio for negative deflection input signals. Each diode is separately biased to conduct at predetermined voltage levels or break points by means of resistors 50 through 68 and resistors 50' through 68'. For example, diode 88 has a positive bias voltage applied to its cathode electrode by means of the voltage divider action of resistors 50 and 52 coupled in series across junction 90 and ground such that the cathode electrode of diode 88 is connected to the common connection between resistors 50 and 52. Diode 86 is likewise biased by means of resistors 54 and 56 connected between junction 90 and ground and likewise diodes 84, 82 and 80 are respectively biased by resistors 58 and 60, 62 and 64, and 66 and 68. Diodes 88' through 80' are similarly biased, however a negative bias voltage is applied to the respective anode electrodes inasmuch as junction 92 is coupled to source of negative voltage, not shown, connected to junction 38'. The bias applied to the respective diodes is determined by the magnitude of the voltage appearing across junction 92 and ground and the respective resistance values of the bias resistors 50 to 68 and 50' to 68'.

A second input terminal 34 is provided for the application of vertical deflection signals from a vertical deflection signal source, not shown. Coupled between the second input terminal 34 and ground is a second series connected voltage divider comprising resistors 41, 43, 45, 47 and 49. A second plurality of diodes comprising diodes 81, 83, 85, 87 and 89 and their symmetrical complement diodes 81' through 89' are coupled to the second voltage divider for purposes of varying its divider ratio in a manner similar to the first plurality of diodes coupled to the first or "On axis" voltage divider. The second voltage divider comprising resistors 41 through 49 is designated the "Off axis" divider. Diodes 81 and 81' are connected by their anode and cathode electrodes respectively to the common connection between resistors 41 and 43 while diodes 83 and 83' are connected by their anode and cathode electrodes respectively to the common connection between resistors 43 and 45. Likewise diodes 85 and 85' through 89 and 89' are connected to the common connection of resistors 45, 47 and 49 and the second input terminal 34, respectively. The diodes 81 through 89 are reversed biased by the resistors 51 through 65 and resistor 74 coupled to a source of positive potential, not shown, applied between terminal 38 and ground. The diodes 81 through 89 are reverse biased to predetermined levels or break points for varying the divider ratio of the "Off axis" voltage divider as the magnitude of the vertical deflection input signal applied to second input terminal 34 increases in a positive polarity sense. The complementary diodes 81′ through 89′ are reverse biased by negative bias voltages being applied to their respective anode electrodes by means of resistors 51′ through 65′ and resistor 74′. Diodes 81′ through 89′ are symmetrically biased to conduct at specified breakover levels or specified break points depending upon the magnitude of negative polarity input deflection signals from the vertical deflection source 12 of FIG. 4 not shown. A first transistor 70 comprising an n-p-n type transistor operably connects the "On axis" or first voltage divider with the "Off axis" or second voltage divider for positive input signals such that the collector electrode of transistor 70 is connected to the junction 90 while the base electrode is connected to the common connection between resistors 51–63, the cathode electrode of diode 81 and resistor 74. The base electrode of transistor 70 likewise is coupled to a source of negative bias voltage not shown applied to terminal 39 through base resistor 72. A second transistor 71 comprising a p-n-p transistor couples the "On axis" to the "Off axis" for negative input signals such that the collector electrode is connected to junction 92 and the base electrode is connected to the common connection of resistors 51′–63′, the anode electrode of diode 81′ and resistor 74′. The base electrode is also connected to terminal 39′ through a base resistor 72′ to which is applied a positive source of base bias potential not shown. The respective emitters of transistors 70 and 71 are commonly coupled together by means of resistor 76.

In operation, an uncorrected deflection signal from the horizontal deflection signal source 10 is applied to the first input terminal 32 and a corrected horizontal deflection signal is taken from the output terminal 36 which is then directed to the horizontal deflection amplifier 16. The biasing resistors for diodes 80 through 88 and 80′ through 88′ are respectively coupled to junctions 90 and 92 which control the diode conduction potentials. As the magnitude of the deflection signal applied to input terminal 32 increases in a positive polarity sense diode 80 conducts first followed by diodes 82, 84, 86 and 88 in that order thereby affecting the voltage divider ratio of the "On axis" voltage divider since the resistance appearing across terminal 36 is no longer the series sum of resistors 42, 44, 46, and 48 but becomes progressively smaller as diodes 80 to 88 become conductive. If on the other hand however the deflection input signal to terminal 32 is of a negative polarity diodes 80′ to 88′ will become conductive changing the voltage divider ratio of the "On axis" divider in the same relationship as the positive polarity input to terminal 32 effects diodes 80 to 88. As has been indicated before the network 14 is controlled not only by a single deflection voltage but by deflection signals from both deflection circuits. In order to accomplish this the second voltage divider or "Off axis" divider acts similar to the "On axis" voltage divider in that the deflection signal applied to the second input terminal 34 acts to vary the conductivity of transistor 70 or 71 which in turn affects the bias potential of the diodes in the "On axis" by changing the voltage at junctions 90 and 92. Assuming first that a positive vertical deflection voltage applied to terminal 34. Diode 89 is predeterminedly biased by means of resistors 65 and 63 and 74 to conduct first. As the magnitude of the vertical deflection signal increases diodes 87, 85, 83 and 81 become conductive in that order causing transistor 70 to become more and more conductive and thereby lowering the potential at the collector, which is also the potential at junction 90. Resistors 72 and 74 connected across the terminal 39 and ground are for purposes of establishing a proper D.C. operating point for transistor 70. Likewise, resistors 72′ and 74′ connected across terminal 39′ and ground establish the D.C. operating point of transistor 71. Since the emitter electrodes of transistors 70 and 71 are tied together through the resistor 76 collector currents in both transistors are forced to be equal and the potential at junctions 90 and 92 must therefore be equal and change the same amount. If the vertical deflection signal applied to second input terminal 34 is of a negative polarity diodes 89′ through 81′ become conductive in the same manner as diodes 89 through 81, thus establishing operation which is independent of the polarity of the respective inputs.

The action of the diodes becoming conductive with respect to the "On axis" voltage divider causes the ratio to change nonlinearly and a correction curve approximating a particular curve of FIG. 3 for example, curve *b*, can obtained. As the "Off axis" voltage divider has its divider ratio changed by the action of its associated diodes transistor 70 or 71 conducts to control the potentials at junction 90 or 92 and therefore a correction curve approaching curve *d* can be established. Since the uncorrected vertical and horizontal deflection voltage signal input can be positive or negative, the device is insensitive to polarity and therefore electrically symmetrical. The right side is operating at positive, the left side at negative polarities. If the inputs have opposite signs, the circuit maintains its symmetry because of the unique connection of both transistors 70 and 71, having the same common collector current, and points 90 and 92 with always change the same amount independent of which transistor is controlling the collector current.

Because the "On axis" voltage divider resistors are relatively low values (e.g. resistor 48 can be of the order of a few hundred ohms), system bandwidth is not appreciably affected. It should be pointed out also that the "Off" axis input at terminal 34 cannot produce an output at terminal 36 if the input signal at terminal 32 is zero, because all diodes associated with the "On axis" are nonconducting. Conversely there is no reaction from the horizontal deflection channel into the vertical deflection channel.

While FIGURE 5 has been explained assuming that the correcting network 14 is adapted to operate on both positive and negative deflection signals, one skilled in the art will fully appreciate the fact that in an application where only one polarity of signal is directed thereto one side of the symmetrical network including its transistor can be eliminated without detracting from the spirit and scope of the invention.

As an example of how the design of network proceeds the number of diode break points must first be selected. This depends on the desired degree of accuracy and tube geometry. As a guide line it can be stated that for standard spherical tubes with about 70° deflection angle, five diode break points are sufficient to obtain linearity accuracies of better than .5%.

The first task is to select the "On axis" voltage divider comprising resistors 40 through 48. As a rule of thumb, the resistors must be arranged in rising order with resistor 48 having the smallest value. Its value depends on the bandwidth considerations and driving capabilities. Once resistor 48 is selected to be, for example 200 ohms, resistor 46 is chosen to be approximately 1.5 to 2 times larger and resistance 44 is again 1.5 to 2 times larger than resistor 46 and so on. The largest factor would be chosen if the required correction is large.

It is apparent in examining FIGURE 5 that the firing potential of each diode is dependent on the ratio of resistor 52 to resistor 50, resistor 56 to resistor 54 and so on, whereas their absolute values determine the change in slope of the correction curve desired as shown in FIGURE 3. Since the maximum input amplitude of the deflection signal is known, the five diode firing potentials can be selected and distributed evenly over the amplitude range. Having selected resistors 54 to 68, the input-output ratio of the network can be calculated and compared if desired with the value obtained from the following equation:

$$k=\frac{I_{corr}}{I_0}$$
$$=1/\sqrt{(2n^2-2n+1)-2(2n-1)\sqrt{n^2-p^2\sin^2\alpha_{0_{max.}}-q^2\sin^2\beta_{0_{max.}}}}$$

where $k$ is the correction factor,
$I_{corr}$ is the input current after correction,
$I_0$ is the input current before correction,
$n$ is the diameter ratio $R_1/R_0$ of the tube, where,
$R_1$ is the radius of curvature of the tube, and
$R_0$ is the radius of deflection,
$p=I_0/I_{0_{max}}$ is the relative $x$ input amplitude,
$q=I_0/I_{0_{max}}$ is the relative $y$ input amplitude,
$\alpha_{0_{max}}$ is the maximum uncorrected $x$ deflection angle,
$\beta_{0_{max}}$ is the maximum uncorrected $y$ deflection angle.

The next step is to select the "Off axis" network, which can be done in a similar manner. The voltage divider comprising resistors 41 through 49 may however in this case consist of equal resistors with the conduction potentials evenly distributed over the vertical input amplitude range. The fastest method to obtain the resistor values of resistors 51 through 65 and 51' through 65' consists in observing the actual spot displacement at the tube screen. If the horizontal input is held constant and the vertical is increased from zero to its maximum value the spot must travel along a vertical line. This must be repeated for different values of horizontal deflection signals. A TV type raster or test pattern can also be employed which permits the simultaneous observation of all four screen quadrants.

What has been shown and described therefore is a linearity correction generator which is basically a voltage dependent nonlinear voltage divider which provides a corrected deflection output signal which is a function of both the vertical and horizontal deflection signal amplitudes.

Although the present invention has been described with a certain degree of particularity, it should be understood that the present disclosure has been made by way of example only and that numerous changes in the detail of the circuitry by way of combination or arrangement of elements may be resorted to without departing from the scope and spirit of the present invention.

I claim as my invention:

1. A linearity correction circuit for a cathode ray tube display, comprising in combination: means for generating an electron beam; target means; a source of deflection signals; deflection means coupled to said source of deflection signals and cooperating with said electron beam to scan a raster of a predetermined shape on said target means; a voltage controlled nonlinear voltage divider coupled between said deflection means and said source of deflection signals, said source of deflection signals altering the divider ratio of said voltage divider in relation to the magnitude of said deflection signals directed thereto for compensating for nonlinear distortion of said raster.

2. A linearity correction circuit for a cathode ray tube display, comprising in combination: means for generating an electron beam; target means adapted to be struck by said electron beam; a source of deflection signals; deflection means coupled to said source of deflection signals and cooperating with said electron beam to scan a raster of predetermined shape on said target means; a voltage divider coupled between said source of deflection signals and said deflection means including means for altering the divider ratio of said voltage divider in proportion to the magnitude of said deflection signals in a non-linear relationship for directing corrected deflection signals to said deflection means to compensate for non-linear distortion of said raster displayed on said target means.

3. A linearity correction circuit for a cathode ray tube display, comprising in combination means for generating an electron beam; target means adapted to be struck by said electron beam; a source of deflection signals; deflection means activated by said deflection signals and cooperating with said electron beam to scan a raster on said target means; a variable voltage divider coupled between said deflection means and said source of deflection signals, said voltage divider comprising a plurality of resistors connected in series across said deflection signals; a plurality of diode means selectively connected across said plurality of resistors including bias means for causing predetermined breakdown points of said plurality of diodes in relation to the magnitude of said deflection signals for providing a nonlinear output with respect to said deflection signals for providing a corrected deflection signal to said deflection means to compensate for nonlinear distortion of said raster.

4. A linearity correction generator for a cathode ray tube display comprising in combination: means for generating an electron beam; target means associated with said electron beam for being struck thereby; a first and a second source of deflection signals for mutally perpendicular deflection axes; first and second deflection means for said axes and activated by said deflection signals to provide a predetermined trace on said target means; a voltage variable non-linear voltage divider for each of said axes coupled between said source of deflection signals and said deflection means; said voltage divider comprising a plurality of resistors connected in series across deflection signals from each of said axes, a plurality of diodes including means for biasing said diodes at selected conduction levels coupled across selected resistors of said plurality of resistors, said diodes being responsive to said deflection signals and becoming selectively conductive in relation to the magnitude of said deflection signals to provide a corrected output to said deflection means for correcting linearity distortion caused by the pin cushion effect.

5. A deflection circuit for correcting for pincushion distortion of cathode ray tubes comprising in combination: a cathode ray tube having an electron beam means and a target means; a first source of deflection signals for one axis of deflection; a second source of deflection signals for another axis of deflection; deflection means activated by both said first and said second source of deflection signals to define a predetermined trace on target means; a first and a second nonlinear controlled voltage divider network coupled between said first source of deflection signals and said deflection means and said second source of deflection signals and said deflection means respectively; circuit means operably connecting both said first and said second source of deflection signals to said first and said second voltage divider network to provide control signals thereto to selectively change the divider ratio of said first and said second voltage divider in accordance with the respective magnitudes of said deflection signals for supplying corrected deflection signals for each of said axis of deflection to offset said nonlinear distortion.

6. A linearity correction generator for cathode ray tube apparatus comprising in combination an electron beam source; target means; a source of deflection signals for an X coordinate axis of deflection; a source of deflection signals for a Y coordinate axis of deflection; deflection means for the X coordinate axis; deflection means for the Y coordinate axis; a first non-linear voltage dependent voltage divider coupled between said source of deflection signals for the X coordinate axis and said deflection means for the X coordinate axis; a second non-linear voltage dependent voltage divider coupled between said source of deflection voltage for the Y coordinate axis and said deflection means for the Y coordinate axis; said first and second non-linear voltage divider including means for selectively receiving input signals from both sources of deflection signals, providing corrected deflection signals to said X and Y coordinate deflection means to correct for nonlinear distortion of said cathode ray tube.

7. A linearity correction generator for cathode ray tube apparatus having a horizontal deflection circuit and vertical deflection circuit comprising in combination: first input means for receiving deflection signals from said horizontal deflection circuit; a first plurality of resistance means coupled in series between said first input means a point of reference potential; a first plurality of diodes, including bias means for predeterminedly biasing said plurality of diodes at predetermined conduction levels, selectively coupled across said plurality of resistance means; second input means for receiving deflection signals from said vertical deflection circuit; a second plurality of resistance means connected in series between said second input means and a point of reference potential; a second plurality of diodes, including bias means for predeterminedly biasing said diodes to predetermined conducting levels, selectively coupled across said second plurality of resistance means; and circuit means for coupling said second plurality of diodes to said bias means of said first plurality of diodes for affecting the conduction levels of said first plurality of diodes in accordance with the deflection signals applied to said second input means; and output means coupled to said first plurality of resistors for providing a corrected deflection output signal for said one deflection circuit.

8. A linearity correction generator for cathode ray tube apparatus having a horizontal deflection circuit and vertical deflection circuit comprising in combination: first input means for receiving deflection signals from said vertical deflection circuit; a first plurality of resistance means coupled in series between said first input means a point of reference potential; a first plurality of diodes, including bias means for predeterminedly biasing said plurality of diodes at predetermined conduction levels, selectively coupled across said plurality of resistance means; second input means for receiving deflection signals from said horizontal deflection circuit; a second plurality of resistance means connected in series between said second input means and a point of reference potential; a second plurality of diodes, including bias means for predeterminedly biasing said diodes to predetermined conducting levels, selectively coupled across said second plurality of resistance means; and circuit means for coupling said second plurality of diodes to said bias means of said first plurality of diodes for affecting the conduction levels of said first plurality of diodes in accordance with the deflection signals applied to said second input means; and output means coupled to said first plurality of resistors for providing a corrected deflection output signal for said one deflection circuit.

9. A linearity correction circuit for eliminating the pincushion effect associated with a cathode ray tube display comprising in combination: a horizontal and a vertical deflection circuit including, a source of deflection signals and deflection means for a horizontal and a vertical deflection axis; a first and a second correction network coupled to said horizontal deflection circuit and said vertical deflection circuit respectively, said first and said second correction networks being substantially identical and comprising, first and second input means for selectively receiving deflection signals from said horizontal and said vertical deflection circuit, a voltage divided coupled to said first input means, a plurality of diode means selectively connected across said voltage divider, voltage bias means coupled to each of said plurality of diodes for selectively biasing said each of said diodes to a predetermined level, and a bias voltage source for said first bias means including circuit means for varying the magnitude of said bias source as a function of said deflection signals applied to said second input means.

10. The linearity correction of claim 9 wherein said circuit means for varying the magnitude of said bias source comprises transistor means.

11. A linearity correction circuit for correcting pincushion distortion of a cathode ray tube display comprising in combination: horizontal and vertical deflection circuits each including, a source of deflection signals magnetic deflection means for a horizontal and vertical deflection axis, respectively; a first correction network coupled to said horizontal deflection circuit; a second correction network coupled to the said vertical deflection circuit; said first and said second correction network each comprising, first and second input means, a first resistance voltage divider coupled to said first input means, a first plurality of diode means selectively connected across said voltage divider, first voltage bias means coupled to each of said first plurality of diodes for selectively biasing said each of said diodes to a predetermined conduction level for controlling the divider ratio of said first voltage divider as a function of deflection signals applied to said first input means, a source of bias potential for said first voltage bias means, a second resistance voltage divider coupled to said second input means, a second plurality of diodes selectively connected across said second voltage divider, second voltage bias means coupled to each of said plurality of diodes to said each of said second plurality of diodes for selectively biasing said each of said diodes to a predetermined level for controlling the divider ratio of said second divider as a function of deflection signals applied to said second input means and transistor means coupling said second voltage divider to said source of bias potential for varying said bias potential according to the magnitude of deflection signals applied to said second input means; and circuit means providing input deflection signals from both said horizontal and said vertical circuit to selectively of said first and said second input means, said first correction network providing a corrected output deflection signal for said horizontal deflection means and said second correction network providing a corrected deflection output signal for said vertical deflection means.

References Cited by the Examiner

UNITED STATES PATENTS

| | | | |
|---|---|---|---|
| 2,831,145 | 4/1958 | Albert | 315—24 |
| 3,205,377 | 9/1965 | Nix | 307—88.5 |

OTHER REFERENCES

Zimmerman and Mason: Electronic Circuit Theory, New York, John Wiley and Sons, 1962, p. 76.

References Cited by the Applicant

UNITED STATES PATENTS

| | | |
|---|---|---|
| 2,649,555 | 8/1953 | Lockhart. |
| 2,758,248 | 8/1956 | Garrett et al. |
| 2,831,145 | 4/1958 | Albert et al. |
| 2,842,709 | 7/1958 | Lufkin. |
| 2,906,919 | 7/1959 | Thor et al. |
| 2,954,502 | 9/1960 | Carpenter et al. |

DAVID G. REDINBAUGH, *Primary Examiner.*

JOHN W. CALDWELL, *Examiner.*

T. A. GALLAGHER, *Assistant Examiner.*